Patented Nov. 17, 1953

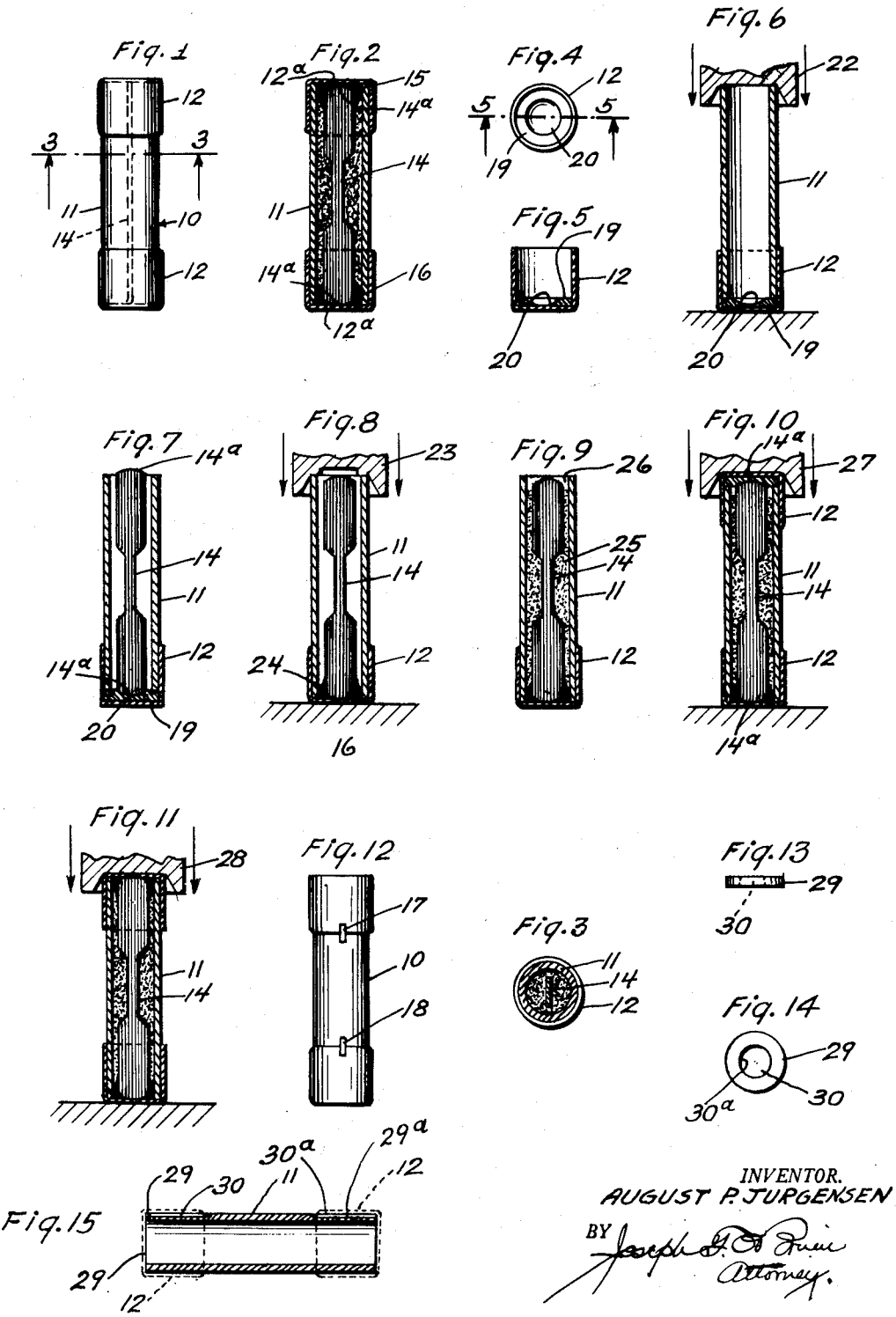

2,659,790

UNITED STATES PATENT OFFICE 2,659,790

CARTRIDGE-TYPE ELECTRICAL FUSE AND METHOD OF MANUFACTURING SAME

August P. Jurgensen, New York, N. Y., assignor to General Fuse Company, Jersey City, N. J., a corporation of New Jersey Application November 30, 1948, Serial No. 62,733

6 Claims. (Cl. 200—131)

This invention relates to improvements in cartridge-type electrical fuses and method of manufacturing same.

Electrical fuses of the cartridge type have each heretofore been conventionally formed of a casing comprising a cylindrical section of tubing or a tube composed of insulating material, such as glass, fiber, pressed paper or the like, provided with metallic end caps or ferrules usually composed of brass, secured at each end thereof and having mounted within the casing a fuse-link. The fuse links were of varying types. In most cases the fuse link was centered within the casing and tubing by passage through oppositely positioned holes in the bottom or contact plates of the opposite metallic end caps which contained depressions within which solder was applied externally, thus producing a contact surface which is partly of the soldered joint and partly of the metal of the cap. Humidity or dampness in the air often caused fuses embodying this external or outside soldered joint to corrode at the ends of such cap, particularly when the fuse is used at the seashore or in territory having a wet or humid climate. Obviously a soldered joint between the cap and the link that is corroded will provide a poor electrical contact and a fuse of this construction is unsatisfactory.

Efforts have also been made to solder the ends of the fuse link to the internal surfaces of the caps by dropping a small loose pellet of fusible solder in one cap, inserting one end of the insulating tube in the cap, cementing or otherwise fastening the cap to the tube, dropping the fuse link into the snugly-capped tube, then applying heat beneath the cap to melt the solder within the cap and to join one end of the link to the inner surface of the tube and then repeating the same steps and operations to similarly apply and fasten the cap on the other end and to similarly solder the fused link to the cap. In this method of dropping a small pellet of solder into the cap, the soldered joint formed between the link and cap is loose and unsatisfactory because no pressure is applied to the solder or the parts being joined and it has been discarded in favor of the earlier method of projecting the ends of the link through the centers of the caps into depressions and providing on the outside of each cap a soldered joint.

One of the objects of the present invention is to avoid the external corrodable joint and at the same time to provide a secure and efficient internal soldered joint between the internal surfaces of the caps and the ends of the link in which the solder is compressed around the surface of the link.

Another object of my invention is in a device of the character specified to utilize a pellet of solder which is initially fastened within each cap and has a central depression adapted to enable accurate centering of the link within the fuse casing without the necessity of providing on the link special transverse projections which contact with or are slightly spaced from the internal surface of the tube.

Still another object of my invention is to provide an internal soldered joint between the end of the link and contact plate of the cap that will, during the soldering operation, be pressed firmly against the end of the link; will have a contact surface with the link of maximum area and will ride upwardly on the surface of the link to provide a compact and efficient joint between the end of the link and the solder and also between the solder and the bottom or contact plate of the cap.

Still another object of my invention is to provide a method by the use of which the links may be speedily and firmly applied and which may be utilized with or without the provision in the tube of a fuse-surrounding or filling medium or material which is preferably in granular or pulverized form.

Still another object of my invention is to provide a method in which a solder-melting heat is employed and pressure is simultaneously applied on the solder by utilizing the movement of the insulating tube for the purpose of consolidating and pressing the solder during the solder-heating operation into intimate contact with the ends of the link and with the bottom or contact plate of the caps.

Still another object of my invention is to utilize a pellet of solder having a diameter similar to the internal diameter of the cap and fitted therein; then to employ the end of the insulating tube to axially compress the pellet of solder while the same is heated against the end of the link and thus to cause a tight and efficient joint that is preferably humped up toward the axis at the end of the tube and on the link positioned at said axis, and thus to cover an effective area around the end surfaces of the link as well as around the internal surface of the cap bottom.

Still another object of my invention is to provide a method of manufacture which will be economical and which will materially reduce the manufacture and cost of the fuse.

Still another object of my invention is to provide a method which may be completely carried out through the use of machines and which avoids and eliminates operations by hand which are always expensive.

Still another object of my invention is to provide a method by which the pellet of solder is initially firmly engaged frictionally within the cap and a tube is employed which tightly fits the caps to apply pressure to the solder in an axial direction while heat is simultaneously applied, and preferably employ a method in which heat and pressure are applied to the solder in each of the caps successively for the purpose of soldering the joints.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

Fig. 1 is a view in side elevation of the outside of a non-renewable electrical fuse of the cartridge type embodying my invention;

Fig. 2 is a longitudinal section on the line 2—2 of Fig. 1, looking in the direction of the arrows;

Fig. 3 is a cross-section on the line 3—3 of Fig. 1, looking in the direction of the arrows;

Fig. 4 is a top plan view of one of the caps used in the manufacture of the fuses shown in Figs. 1 and 2;

Fig. 5 is a section on the line 5—5 of Fig. 4, looking in the direction of the arrows;

Fig. 6 is a longitudinal section showing one end of a tube being initially applied to a cap such as shown in Figs. 4 and 5 by pressure;

Fig. 7 is a section similar to Fig. 6 in which a link is positioned in a capped tube such as shown in Fig. 6;

Fig. 8 is a section similar to Figs. 6 and 7 showing the tube being forced downwardly by pressure while heat is employed beneath the cap to provide a soldered joint between one end of the link and the cap;

Fig. 9 is a similar section showing the tube removed from the pressure applying device and filled with a filling material;

Fig. 10 is a similar section showing the upper cap initially applied to the upper end of the tube;

Fig. 11 is a similar longitudinal section showing the method of applying heat and pressure to a cap while in place at the upper end of the tube to provide an effective soldered joint between the link and said cap;

Fig. 12 is a view in side elevation at right angles to Fig. 1 showing my preferred method of fastening the cap to the tube;

Fig. 13 is an end elevation of the pellet of solder in modified form before being inserted in the cap;

Fig. 14 is a plan view of such pellet of solder in Fig. 13; and

Fig. 15 is a longitudinal section of a modified form showing means for releasing gas produced during the soldering operation.

Referring now to these drawings, which illustrate a preferred embodiment of my invention, a fuse construction as illustrated is simple, capable of ready and easy assembly and avoids the unsatisfactory features and disadvantages of prior art construction. Also in accordance with my method, the manufacture and assembly of these fuses may be accomplished by machinery without the use of costly hand operations so that the ultimate manufacturing cost of the fuse will be materially reduced while the article itself is improved.

In the preferred embodiment illustrated, 10 indicates a fuse casing comprising a tube 11 composed of insulating material and metallic end-caps or ferrules 12—12 preferably composed of brass and a fuse link 14 positioned axially within the casing 10 by providing rounded ends 14ª adapted to seat on rounded depressions formed on the internal surfaces of the bottoms of the caps, and firm and efficient soldered joints 15 and 16 are provided between the fusible link 14 and the top portions 12ª, 12ª of the caps 12, 12. The end-caps or ferrules 12, 12 are composed of any suitable electrical conducting material, such as brass, and may be fixedly mounted upon the tubes in any suitable manner, as for example by the integral clips 17 and 18 or by a suitable crimping of the brass ferrules around the tube, or if desired by the use of cement or other adhesive.

In accordance with my present invention, each of the caps or ferrules has, as shown in Figs. 4 and 5, a pellet 19 of suitable solder fitted and fastened therein. Each pellet preferably has a diameter similar to the internal diameter of a cap so as to closely fit internally within the bottom of the cap and to frictionally engage the wall thereof. Each pellet 19 is provided, as shown, with a central depression 20 adapted to engage an end of the link and to centralize or position the link 14 axially within the tube 11 and casing 10. The depression 20 is preferably of rounded conformation and each end 14ª is rounded to fit the depression 20 and thus to initially position the link in said axial position and to suitably space the same from the wall of the tube 11.

In Fig. 6, I have shown my preferred method of initially inserting by a press head 22 the tubular insulating tube 11 into one of the caps 12. The tube 11 preferably accurately and tightly fits internally within the cap or ferrule 12 and preferably the tube is initially forced into the position shown in Fig. 6. Thereafter, as shown in Fig. 7, the link 14 is passed into the singly-capped tube 12, and because of the depression 20 in the pellet 19, said link 14 will automatically assume an axial or centralized position within the tube 11 and cap.

In Fig. 8 I have shown my preferred method of forming a soldered joint between the link member and the bottom or contact plate of a cap 12. In such a soldered joint, in order to provide efficient contact between the solder on the one hand and the link and brass cap on the other hand, the solder, during the heating of the solder and the making of the joint, should be subjected to pressure toward the axis of the tube, and in said Fig. 8 I have shown pressure being applied by the press head 23 on the tube 11 to force the same to the bottom of the cap and to displace toward the axis the ring of solder material of the pellet that is located beneath the edge of the tube. This solder material is moved toward the axis and simultaneously presses and compresses the remainder of the solder material toward the axis of the casing or tube and against the link and internal surfaces of the contact plate of the cap. The solder material within the displaced ring and particularly at the axis adjacent to the link rises into a conical conformation, as shown at 24, to form what I shall term a webbed soldered joint between the link and the cap. The molten solder is forced beneath the rounded end of the link and because of the compacting thereof produced by the pressure applied thereto through the tube, a compacted, webbed joint of substantially conical conformation is produced and a highly efficient joint between the internal surface of the contact plate of the cap and the link will be provided. The conical formation is apparently produced by the downward pressure of a tube of insulating material which repels the molten solder so that it does not rise along the inside surface thereof but on the contrary moves, apparently by capillary attraction, toward and along the surface of the fused link.

In Fig. 9 I have shown the tube 11 filled with a pulverized filling material 25 of conventional form, and in the preferred embodiment of my invention shown a small space 26 is left at the top portion of the tube to permit connection of the other cap, and in Fig. 10 I have shown the other cap being forced into initial position by the press head 27 in which the depression in the solder pellet within the cap contacts with the end 14ª of the link and the perimetric edge of said pellet is in contact with the top edge of the tube, and when so positioned the parts are now prepared for the formation of the soldered joint between the upper cap 12 and the link.

In Fig. 11 I have shown further pressure combined with heat being applied through the press head 28 and in this operation a soldered joint is formed at the upper end of the tube which is compacted, webbed and in all respects similar to the joint hereinabove described in relation to the joint at the opposite end of the fuse casing.

In Fig. 12 I have shown a view in side elevation of the completed fuse casing and in this view show the said casing connected by the integral clips 17 and 18 respectively.

In Figs. 13 and 14 I have shown another form of pellet in which, instead of the rounded depression 20, I have utilized a ring 29 of material having an axial hole 30 extending completely through the ring. In this modification a ring 29 will be seated in the bottom of each of the caps 12 and the hole 30 will be substituted for the depression 20. In some respects the use of the hole 30 is preferable to the depression 20 because the edge 30ª of the hole will enable more ready shifting and a centralizing of the link than is possible with the rounded depression. In other respects the action in the formation of the soldered joint of the ring 29 shown in Figs. 13 and 14 is in all respects similar to that hereinabove described.

It is desirable to exhaust from the casing gas formed in the making of the soldered joint at the upper end of the casing, and with this end in view I preferably provide an outlet channel for the escape of such gas or gases. Thus, I provide in each of the opposite edges of the tube 11, as shown in Fig. 15, a small notch 29 or a perforation 29ª and registering and communicating with such notch or perforation I provide grooves 30—30ª. The notch 29 is of a height to extend slightly above the webbed joint 24 so as to allow the gases to escape above said joint and is so small as not to materially affect the making of the joint.

Having described my invention, I claim:

1. An electrical fuse comprising a fuse casing composed of a tube of insulating material and metallic end caps mounted on and closing each end of said tube, a fuse link disposed generally axially within said tube having edge portions sloping from opposite ends of the link toward said tube and inwardly toward the central portion of said link, and soldered joints between the ends of said link and the internal surfaces of said caps, each joint comprising a body of solder material having an area of connection with the fuse link extending inwardly from the end plate of the cap along the link and the sloping edge portions thereof and extending from opposite portions of the internal surface of the tube to the fuse link at the axis of said tube, said connection with the link being formed by displacement by the tube of solder material of the joint from the perimetric edge thereof toward the axis of the tube.

2. An electrical fuse comprising a fuse casing composed of a tube of insulating material and metallic end caps mounted on and closing each end of said tube, a fuse link disposed generally axially within said tube having edge portions sloping from opposite ends of the link toward said tube and inwardly toward the central portion of said link, and soldered joints between the ends of said link and the internal surfaces of said caps, each joint comprising a body of solder material having an area of connection with the fuse link, said joint being substantially conical in conformation with the base thereof fused to the bottom plate of the cap, the outer edges of the joint contacting with the inner surface of the tube and inwardly disposed surfaces of the conical joint extending from the perimetric edge of the plate to the axis of the casing to surround and produce said area of connection with said link, said conical shape being formed by displacement by the tube of solder material from the perimetric edge of the soldered joint toward the center thereof.

3. A method of making a cartridge type electrical fuse comprising the steps of preparing the cap and link for soldering by tightly fitting within the bottoms of a pair of metallic caps pellets of solder having edge portions extending into contact with the internal walls of said caps at opposite sides of the axis thereof, pressing one of the opposite ends of an insulating tube into one of said caps into contact with the upper surface of said contained pellet adjacent to said contacting portions of the edge thereof, passing a link into the capped tube into contact with the pellet, forming a joint between the adjacent end of the link and the internal surface of the cap by applying heat to the external surface of the latter to melt the solder and simultaneously forcing said tube to the bottom of said cap to cause an axially directed pressure to be applied on the edge portions of the pellet of solder, applying the other prepared cap to the opposite end of said tube, and repeating the said steps of forming a joint between the other end of the link and the internal surface of the other cap by applying heat to the external surface thereof to melt the solder and simultaneously forcing the cap and edge of the tube into contact.

4. A method of making a cartridge type electrical fuse comprising the steps of depressing link seats of given shape in pellets of solder and shaping the ends of a fuse link to fit within the depressions, preparing the cap and link for soldering by tightly fitting within the bottoms of a pair of metallic caps said pellets of solder having the depressed link-seats extending upwardly and provided with edge portions extending into contact with the internal walls of said caps at opposite sides of the common axis thereof, pressing one of the opposite ends of an insulating tube into one of said caps into contact with the upper surface of said contained pellet adjacent to said contacting portions of the edge thereof, passing said link into the capped tube into contact with the pellet, initially centralizing the link in the casing by fitting the shaped end thereof into the depressed link-seat therein, forming a webbed and compacted joint between the adjacent end of the link and the internal surface of the cap by applying heat to the external surface of the latter to melt the solder and simultaneously forcing said tube to the bottom of said cap to cause an axially-directed pressure to be applied on the cap-contacting edge portions of the pellet of solder, applying the other prepared cap to the opposite end of said tube, and repeating the said steps of forming a webbed and compacted joint between the other end of the link and the internal surface of the other cap by applying heat to the external surface thereof to melt the solder and simultaneously forcing the cap and edge of the tube into contact.

5. The method of making cartridge type electrical fuses which comprises preparing the cap and link for soldering by fitting within the bottom portions of a pair of metallic caps solder elements having edge portions for extending into frictional engagement with the internal walls of said caps, pressing one end of an insulating tube into one of said caps and into contact with the upper surface of the solder element adjacent to said edge portions thereof, passing a link into the capped tube and into contact with said solder element, forming a webbed joint between the adjacent end of the link and the internal surface of the cap by applying heat to the external surface of the latter to melt the solder element and simultaneously forcing said tube to a position adjacent the bottom of said cap to cause an axially directed pressure to be applied on the edge portions of the solder element, applying the other prepared cap to the tube, and repeating the said steps of forming a webbed joint between the other end of the link and the internal surface of the other cap by applying heat to the external surface thereof to melt the solder element and simultaneously forcing the cap and edge of the tube together.

6. The method as claimed in claim 5, together with the step of providing said solder elements with recesses for assisting in positioning said link within the tube.

AUGUST P. JURGENSEN.

References Cited in the file of this patent

UNITED STATES PATENTS

| Number | Name | Date |
| --- | --- | --- |
| 717,711 | Norton | Jan. 6, 1903 |
| 1,831,438 | Bussmann | Nov. 10, 1931 |
| 1,922,642 | Sundt | Aug. 15, 1933 |
| 2,041,333 | Sundt et al. | May 19, 1936 |
| 2,166,033 | Alberga et al. | July 11, 1939 |
| 2,313,373 | Sundt | Mar. 9, 1943 |

FOREIGN PATENTS

| Number | Country | Date |
| --- | --- | --- |
| 545,745 | Great Britain | June 10, 1942 |
| 566,713 | Great Britain | July 25, 1944 |